(12) United States Patent
Bass et al.

(10) Patent No.: US 6,278,095 B1
(45) Date of Patent: Aug. 21, 2001

(54) INDUCTION HEATING FOR SHORT SEGMENTS OF PIPELINE SYSTEMS

(75) Inventors: Ronald M. Bass; Frans F. Kopp, both of Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/628,391

(22) Filed: Aug. 1, 2000

Related U.S. Application Data (60) Provisional application No. 60/147,018, filed on Aug. 3, 1999.

(51) Int. Cl.⁷ .................................................. H05B 6/10
(52) U.S. Cl. ....................... 219/629; 219/633; 219/635; 166/248; 166/60
(58) Field of Search ............................. 219/629, 630, 219/635, 633; 156/272.4, 274.2; 166/248, 60, 61

(56) References Cited

U.S. PATENT DOCUMENTS

| | | | |
|---|---|---|---|
| 2,178,720 | * 11/1939 | Daniels | 219/630 |
| 2,178,721 | * 11/1939 | Daniels | 219/629 |
| 2,224,403 | 12/1940 | Lines | 219/39 |
| 2,302,774 | * 11/1942 | Jarvis | 219/629 |
| 2,306,831 | 12/1942 | Proctor | 219/39 |
| 2,806,931 | 9/1957 | Akerlof | 219/19 |
| 2,851,197 | 9/1958 | Colton | 222/146 |
| 3,483,374 | 12/1969 | Erben | 250/49.5 |
| 3,515,837 | 6/1970 | Ando | 219/10.49 |
| 3,549,943 | 12/1970 | Church | 315/111 |
| 3,604,893 | 9/1971 | Horton | 219/300 |
| 3,891,828 | 6/1975 | De Corso | 219/383 |
| 3,975,617 | 8/1976 | Othmer | 219/300 |
| 4,046,157 | * 9/1977 | Cazalaa et al. | 137/74 |
| 4,366,356 | * 12/1982 | Ando | 219/629 |
| 4,645,906 | 2/1987 | Yagnik et al. | 219/301 |
| 4,716,960 | 1/1988 | Eastlund et al. | 166/60 |
| 4,808,795 | 2/1989 | ThÖrnblom | 219/383 |
| 5,142,115 | 8/1992 | Weidman et al. | 219/10.491 |
| 5,241,147 | * 8/1993 | Ahlen | 219/629 |
| 5,256,844 | * 10/1993 | Grosvik et al. | 219/629 |
| 5,289,561 | 2/1994 | Filho | 392/478 |
| 5,960,644 | 10/1999 | Nagelvoort et al. | 62/622 |
| 6,049,657 | * 4/2000 | Sumner | 392/469 |

FOREIGN PATENT DOCUMENTS

| | | | |
|---|---|---|---|
| 1 248 572 | 10/1971 | (GB) | 213/210 |
| 0105343 | 8/1979 | (JP) . | |
| 0092000 | 6/1983 | (JP) | 392/478 |
| 0932084 | 5/1982 | (RU) | 392/478 |

OTHER PUBLICATIONS

Brochure—*Introduction to Direct Heating of Subsea Pipelines*, Statoil, Saga Petroleum, Feb. 1998.

* cited by examiner

*Primary Examiner*—Philip H. Leung (57) ABSTRACT

An subsea pipeline system having jumpers (short segments connecting equipment or wells and the main segments) that can be electrically heated is provided. The jumpers are heated by induction coils placed around the jumpers, either before placing the jumpers subsea or afterward. Electrical power may be supplied to the induction coils from current flow in the walls of the heated segment of pipeline or from an external source such as from a subsea transformer or ROV.

19 Claims, 7 Drawing Sheets

Prior Art

Fig. 1

Prior Art

INDUCTION HEATING FOR SHORT SEGMENTS OF PIPELINE SYSTEMS

CROSS REFERENCE RELATED APPLICATIONS

This application claims the benefit of U.S. provisional application Ser. No. 60/147,018, filed Aug. 3, 1999.

BACKGROUND OF THE INVENTION

1. Field of the Invention

The present invention relates to methods for electrically heating subsea pipelines. More particularly, the invention relates to electrically heating short segments of pipeline systems with induction heating coils.

2. Description of the Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combine with water at reduced temperatures to form a solid material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography require excessive time and may create more operational problems and be costly in terms of lost production.

The problem of lower temperatures in subsea pipelines has been addressed by placing thermal insulation on the lines, but the length of some pipelines makes thermal insulation alone ineffective. Increased flow rate through the lines also helps to minimize temperature loss of the fluids, but flow rate varies and is determined by other factors. Problems of heat loss from a pipeline increase late in the life of a hydrocarbon reservoir because production rates often decline at that time. Problems become particularly acute when a pipeline must be shut-in for an extended period of time. This may occur, for example, because of work on the wells or on facilities receiving fluids from the pipeline or hurricane shutdown. The cost of thermal insulation alone to prevent excessive cooling of the lines becomes prohibitive under these conditions.

Heating of pipelines by bundling the lines with a separate pipeline that can be heated by circulation of hot fluids has been long practiced in the industry. Also, heating by a variety of electrical methods has been known. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999)

Two configurations for electrical heating have been considered. In one method of electrical heating, a pipe-in-pipe subsea pipeline is provided by which a flow line for transporting well fluids is the inner pipe and it is surrounded concentrically by and electrically insulated from an electrically conductive outer pipe until the two pipes are electrically connected at one end. Voltage is applied at the opposite end and electrical current flows along the exterior surface of the inner pipe and along the interior surface of the outer pipe. This pipe-in-pipe method of heating is disclosed, for example, in Ser. No.081625,428, filed Mar. 26, 1996, which is commonly assigned and incorporated by reference herein.

In a second configuration, a single flowline is electrically insulated and current flows along the flowline. This is called the "SHIP" system (Single Heated Insulated Pipe). Two SHIP systems have been considered: the fully insulated system, requiring complete electrical insulation of the flowline from the seawater, and the earthed-current system, requiring electrical connection with the seawater through anodes or other means. For both systems, current is passed through the flowline pipe.

An earthed-current system developed in Norway does not require the use of insulating joints or defect-free insulation, and hence avoids the problem of shorting by water and the effects of coating defects. ("Introduction to Direct Heating of Subsea Pipelines," overview by Statoil, Saga et al, February 1998). In that system, power is connected directly to the pipe at each end of a heated section and electrodes connected to the pipe along the pipeline are exposed to seawater. This configuration allows current to flow in both the pipe and the seawater, therefore eliminating potential drop across the insulation on the pipe, so that a defect in the pipe insulation does not result in electrical failure. Since the heated section is not electrically isolated from the rest of the pipeline by insulation joints, some means must be provided to prevent current from flowing along the pipeline to areas where it may cause corrosion damage or interfere with control systems. This is accomplished by means of a buffer zone, which is a length of pipe approximately 50 meters in length between the power connection where current enters or leaves the pipeline and adjacent structures. In that design, the buffer zone may incorporate a series choke to further impeded leakage currents. This method requires that the return cable be as close to the pipe as possible, or electrical efficiency will be impractically low. This configuration is not practical for some deepwater applications and the system is considerably less energy-efficient than a fully insulated system.

A single heated insulated pipe (SHIP) method of electrically heating a pipeline is disclosed in U.S. Pat. No. 6,049, 657. In this method, an electrically insulated coating covers a single pipeline carrying fluids from a well. An alternating current is fed to one end of the pipeline through a first insulating joint near the source of electrical current and the current is grounded to seawater at the opposite end of the pipe to be heated through a second insulating joint.

The electrical heating of pipelines offers many advantages, but in a system where several pipelines are connected by short segments or where a well or other equipment is connected to the long pipeline by a short segment of pipeline, there is no adequate method to heat the short segment of the system. The short segments are often called "jumpers." Inability to control the direct electric heating of the whole pipeline system may result in formation of hydrates or other flow restrictions in the short segments (jumpers) that can result in the shutdown of the entire pipeline system. Thus, there remains a clear need for an economical method to heat the jumpers in subsea pipeline systems. Some of these pipeline systems may be electrically heated over the main pipelines in the system, but others may be completely unheated.

U.S. Pat. No. 5,241,147 discloses induction heating of subsea pipelines, wherein the induction heating is obtained by induction wires which run parallel to the insulated pipeline. U.S. Pat. No. 5,256,844 also discloses induction heating of subsea pipelines. The induction wires run parallel to the pipeline, preferably as close to the pipe as possible. Both references suggest induction heating for the whole subsea piping system. Using induction heating for the whole subsea piping system may not be practical because it can be very expensive and can require difficult pipelaying techniques.

SUMMARY OF THE INVENTION

Accordingly, a need has arisen for providing adequate heating for short sections (jumpers) in a subsea pipeline system where direct electric heating (i.e., electrical current flowing along the walls of the pipe) is employed for the long pipeline segments in the system.

In accordance with one embodiment of the present invention, induction heating is provided for short segments ("jumpers") in a single heated insulated pipline (SHIP) system for subsea application. Electric power maybe provided from the direct electric heated main flowline to an induction coil placed around a jumper or may be separately supplied. The induction coil may be permanently affixed to a jumper or may be placed around or moved along a jumper by a Remotely Operated Vessel (ROV).

In another embodiment of the invention, induction heating is provided for jumpers in a pipe-in-pipe system for electrically heating subsea pipelines. Electric power may be drawn from the current flow along the pipeline or may be separately supplied.

In yet another embodiment, induction heating is provided to remove plugs in pipeline systems that may have no other electrical heating. Electrical power to the induction coil may be supplied by a source separate from an electrically heated pipeline. After locating a plug in a pipeline or christmas tree on a well or other subsea conduit, an induction coil is placed over the plug and electrical power applied to the coil.

Accordingly, an object of the present invention is to provide a piping system in which all sections of the piping system may be adequately heated so as to maintain flow in all segments.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

Figure 1:
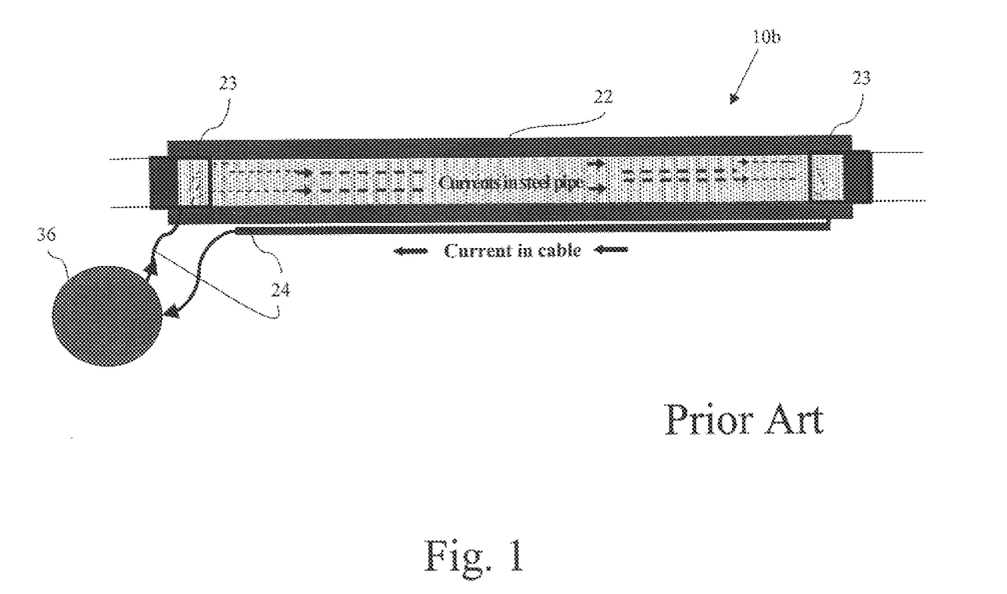
FIG. 1 illustrates a prior art direct electrical heating of a single heated insulated pipe having two flowline insulating joints and a cable return of electrical current.

Referring to FIG. 1, the concept of a Single Heated Insulated Pipe (SHIP) is illustrated. A segment of electrically heated pipeline is generally shown at 10b. Alternating current (AC) power supply 36, commonly supplying 60 Hz electrical power, may be used to supply the electrical power. Other frequencies may be selected. Pipe electrical insulation 22 prevents current flow between the steel walls of pipeline 10b and surrounding seawater. Insulating joints 23 connect to the ends of segment 10b that is to be heated and serve to electrically insulate 10b from the adjoining segments of the pipeline. Electrical current flows from a first insulating joint through the steel wall of pipeline 10b to a second insulating joint and is then returned through cable 24 to power supply 36, thus completing the electrical current. The limitation of flowline insulating joints 23 in long subsea pipelines is that water in the fluids passing through the pipeline may settle to the bottom of a pipeline or to low intervals along the length of the line, particularly when flow through the line is interrupted. The water can then cause an electrical short across the insulating joint, allowing the electrical power supplied for heating the section to be lost by flow through other sections of the line.

Figure 2:
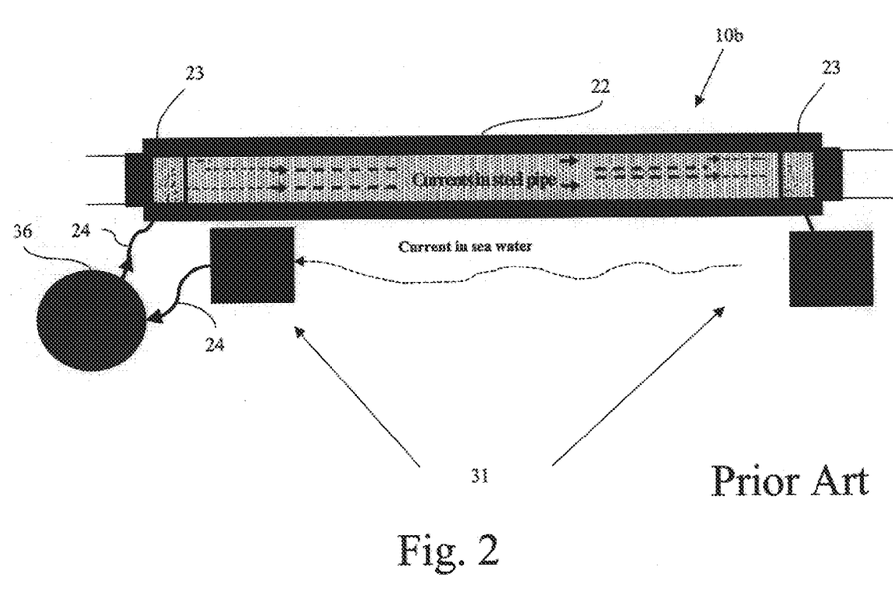
FIG. 2 illustrates a prior art direct electrical heating of a single heated insulated pipe having two flowline insulating joints and seawater return of electrical current.

FIG. 2 illustrates a similar configuration to that shown in FIG. 1 except the return current between insulating joints 23 is now through seawater. A segment of electrically heated pipeline is generally shown at 10b. Seawater electrodes 31 allow current to flow between insulating joints and seawater. Cables 24 connect the AC power supply to a first insulating joint 23 and to a seawater electrode. Such seawater electrodes and insulating joints are known in the subsea pipeline industry and are used for such purposes as corrosion control. The seawater then serves to conduct return current in place of a portion of electrical cable 24 shown in FIG. 1. Flowline insulating joints such as joints 23 have been used in offshore corrosion protection systems, but normally with low voltage and current ratings and without an external electrical terminal introducing electrical current between the insulating joints. The phenomena of water settling and causing an electrical short circuit across insulating joints has been observed in offshore operations. Consequently, for many applications it is desirable to use a heating method for single heated insulated pipe that does not require the use of flowline insulating joints 23.

Figure 3:
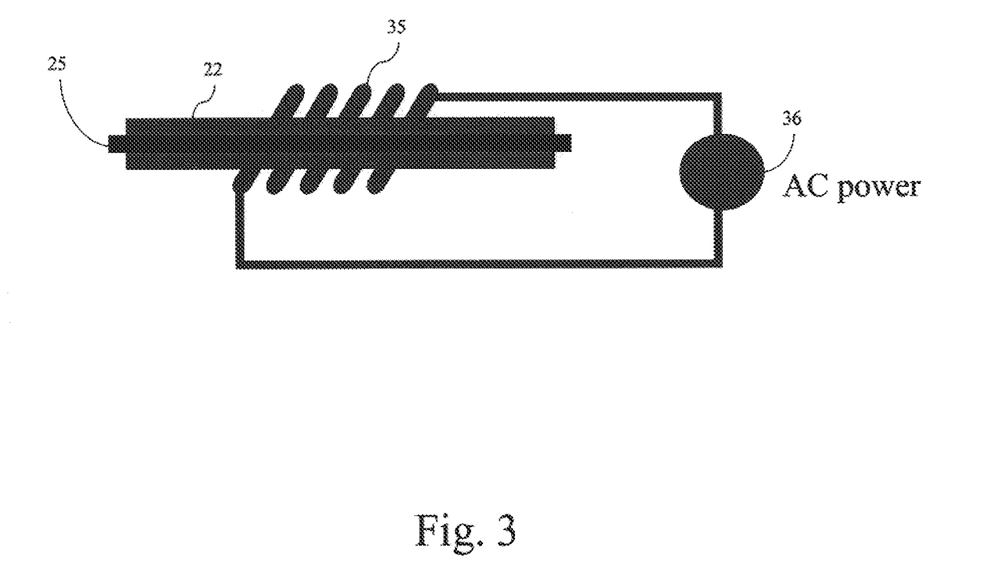
FIG. 3 shows an induction heating coil placed around a section of insulated pipeline with an AC power source connected to the induction heating coil.

FIG. 3 illustrates the concept of electrically heating a jumper by induction. Induction heating coil 35 placed around jumper 25 has insulation layer 22. Alternating current is supplied to induction heating coil 35 from AC power source 36.

Jumpers may go from a well or manifold to a flowline, from a well to a manifold, or from one segment of a flowline to another. Typically, jumpers are in the range from about 30 feet long to about 90 feet long, but they may be shorter or longer in some systems.

Figure 4:
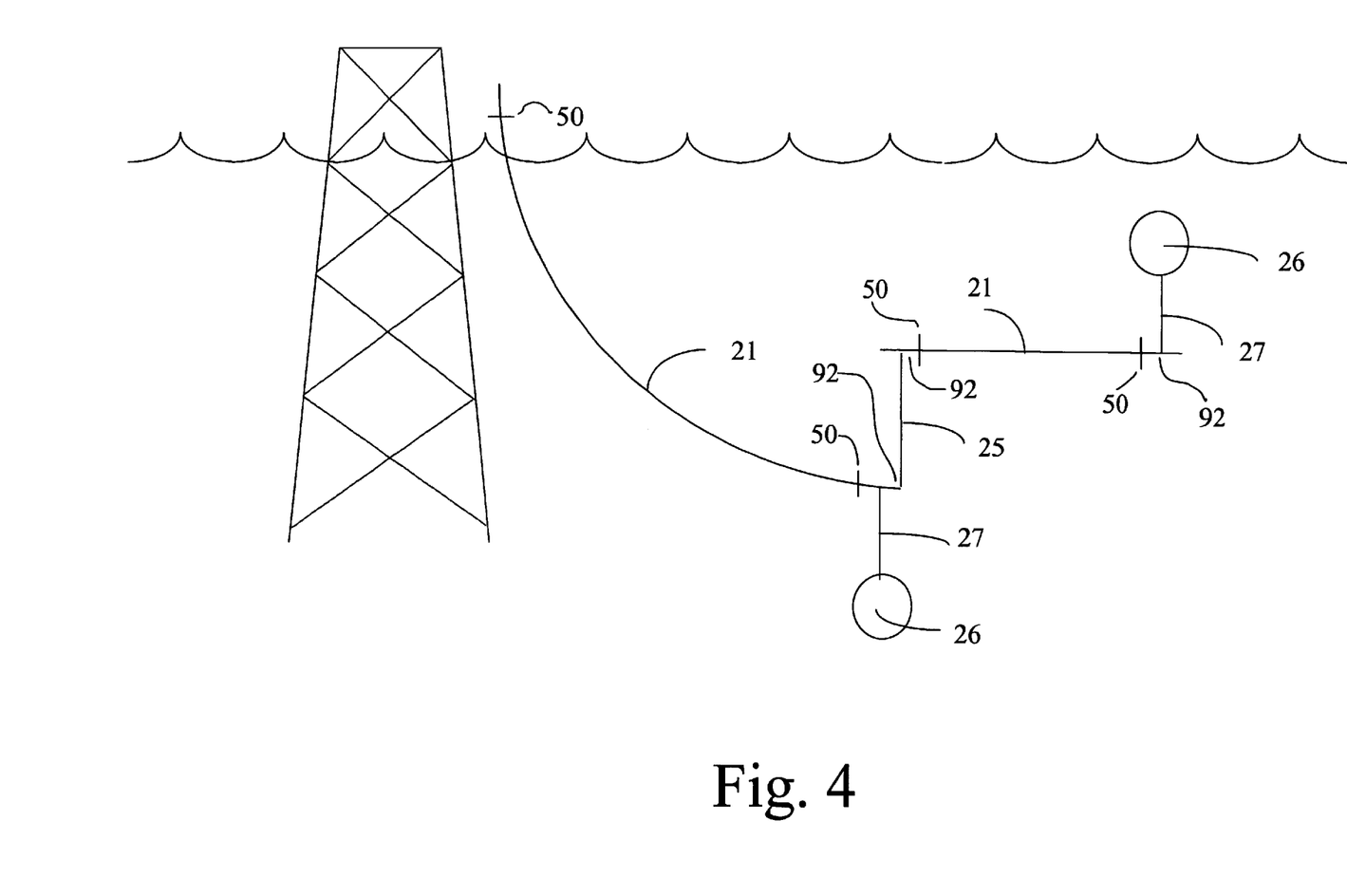
FIG. 4 shows a single heated insulated pipeline system with jumpers used for subsea production.

FIG. 4 illustrates a single heated insulated pipeline system for subsea application. The pipeline system includes two main segments 21 that are directly heated by flow of electric current through the walls of the pipes between connectors 50. The portions of the flowlines beyond the directly heated segments are "buffer" zones 92. Buffer zones in the SHIP system are used to isolate the heated segment electrically from surrounding structures or equipment, as disclosed in the commonly assigned U.S. Patent Application titled "Apparatus and Method for Heating Single Insulated Flowlines," filed concurrently, which is hereby incorporated by reference herein (Ser. No. 09/629,963). A variety of techniques may be used to minimize current flow in buffer zones, as further disclosed in the referenced and incorporated Patent Application. Jumper 25 connects long segments 21 in buffer zones 92 at each end of the segments. Jumpers 27 connect wellheads 26 with main flowlines 21 through buffer zones 92. Jumpers 27 also are joined to main pipeline segments 21 in a buffer zone, so that flow of electrical current from segments 21 to wellhead 26 is minimized.

Figure 5:
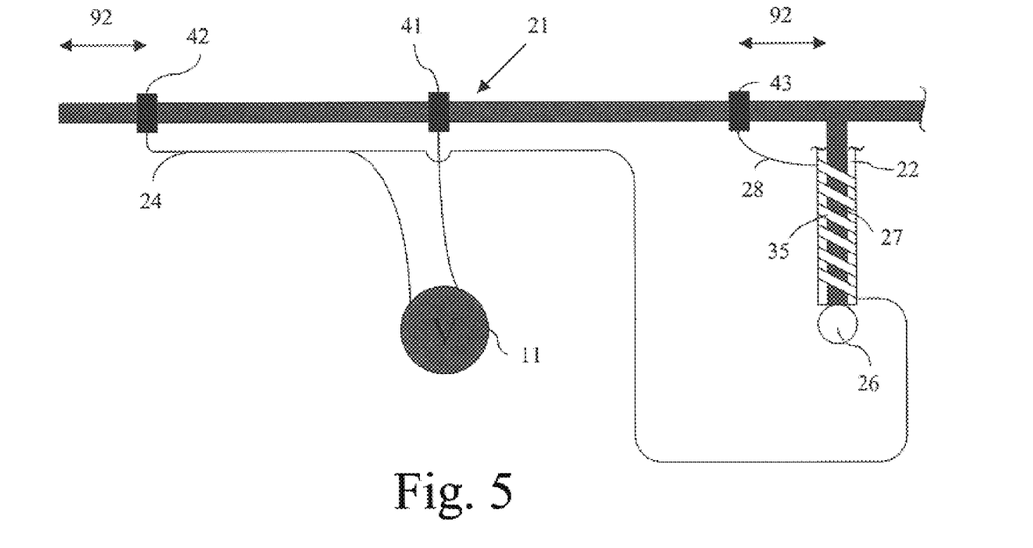
FIG. 5 shows a jumper heated by an induction coil tying into a flowline, with the electric current being supplied from the direct electric heated flowline.

One embodiment of the present invention is shown in FIG. 5, which provides a method for heating the fluid in jumper 27. Here, jumper 27 connects wellhead 26 to main flowline pipe 21 through buffer zone 92. Jumper 27 is insulated with insulation 22. The purpose of buffer zone 92 is to electrically isolate the directly heated segment of pipe 21 between connectors 42 and 43 from adjacent structures. Preferably, cable 28 is placed between induction heating coil 35 and connector 43. Cable 28 allows a desired amount of current to flow from the direct electric heating of flowline pipe 21 into the induction heating coil 35 such that induction heating coil 35 may beat jumper 25. The induction heating coil 35 return current may be connected to any appropriate site. Here, the induction heating coil 35 return current is through return cable 24. The induction heating segment will require a small amount of power compared with the rest of the flowline. Consequently, the current is determined by the flowline, not the inductive heating segment. Based on this current, the number of turns is then chosen to deliver the desired amount of power to the inductive heating segment. Alternatively, the center feed, shown at connector 41, may be placed off-center, toward the inductive heated end, to account for the additional inductive heating load. In another alternative, a choke may be placed on the other end to balance the load.

If a separate power source is used, the amount of current flowing through induction heating coil 35 may be controlled by the number of turns in the coil and by adjusting the voltage and frequency applied to the induction heating coil. The resistance of the coil wire also affects current, but to minimize power requirements, the wire resistance is generally selected to be low enough so that most of the power dissipation is in the pipe and not in the coil wire.

Figure 6:
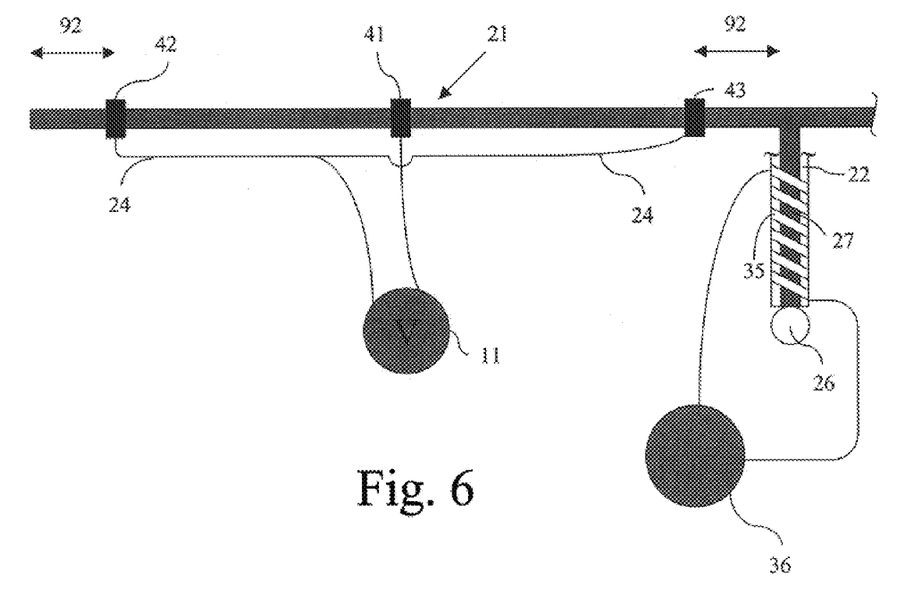
FIG. 6 shows an induction heating coil placed around a section of insulated pipeline with a separate AC power source connected to the induction heating coil.

FIG. 6 shows an alternate embodiment of the present invention where induction heating coil 35 is connected to AC power source 36 separate from the current flowing in main flowline pipe 21. Here, AC power source 36 maybe any power supply available on the sea floor or may be a power source provided by a Remotely Operated Vehicle (ROV) for the temporary heating of a section of a jumper 27. Induction heating coil 35 maybe pre-fabricated or pre-installed on jumper 27 or induction heating coil 35 may be induction heating coil clamp 37 (see FIG. 7) installed on jumper 27, or some other clamping arrangement. Alternatively, coil 35 may be a cable that is wrapped around jumper 27.

Figure 7:
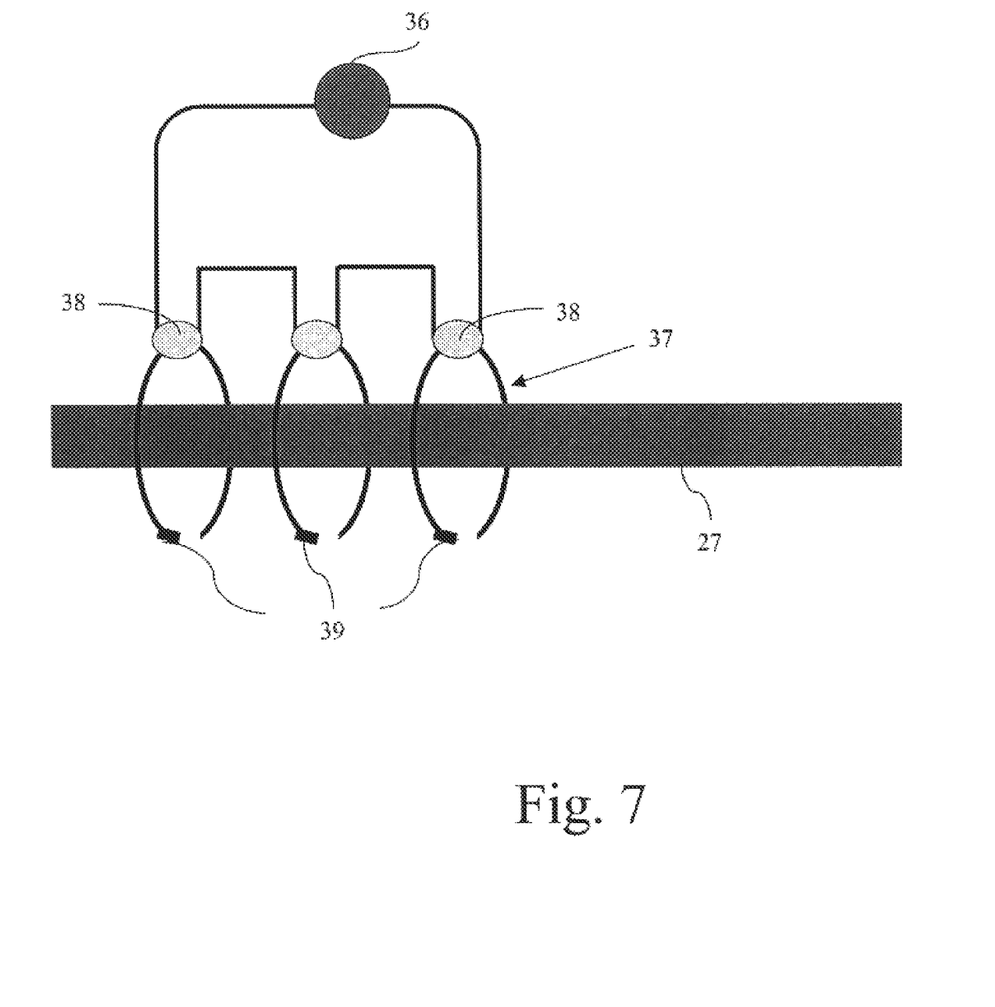
FIG. 7 shows a diagram of an induction heating coil clamp around a segment of pipeline.

Referring to FIG. 7, induction heating coil clamp, shown generally at 37, includes insulating hinge 38 that allows the clamp to be placed around jumper 27. An induction heating coil clamp is known in the coatings industry. For example, in fusion bonded epoxy (FBE) coating of pipe, an induction heating coil clamp is used to heat the pipe and the epoxy is sprayed on the exterior of the pipe. Of course, special construction and procedures are required in clamps such as clamp 37 to be used in subsea operations. An ROV may be used to place clamp 37 around a jumper on the seafloor. It maybe required for the ROV to waterjet material, i.e., silt, from under the bottom of the jumper such that the clamp can connect below the pipeline. The individual coils of the induction heating coil clamp maybe connected, for example, via pluggable and wet-mateable connectors 39. Induction heating coil clamp 37 may be moved by an ROV along a section where flow is impeded or has stopped, allowing selected segments of a jumper to be heated. Here, the electric current to the induction heating coil clamp 37 may be supplied by the ROV.

Jumpers 25 and 27 may have prefabricated or pre-installed insulation 22. Insulation 22 may be installed as follows:

(1) grit blast the pipe to "white metal";
(2) apply a thin layer (about 20 mils.) of FBE;
(3) apply a thin layer (about 10 mils.) of copolymer adhesive; and
(4) apply multiple layers (ranging from about ¼ to 1 inch thick) of thermoplastic material, preferably polypropylene or polyethylene, to build up insulation 22 to the desired thickness.

It may often be determined where flow is impeded or has stopped by selectively shutting in a well or a number of wells with valves at the wellhead and/or using valves in other locations. Also, a pressure-volume study may be used to determine where a blockage exists. A section of piping may be pressured from a given location in a pipeline system and the volume injected be measured to determine where the blockage exists. With selective diverting with valves or a pressure-volume study, the location of a jumper (or other connection) that has hydrate or other restrictions may be determined. This jumper can then be heated with induction heating in order to restore flow. The induction heating may be provided by either permanently installed induction heating coils or a ROV may place an induction heating coil clamp 37 in the proper location and may move the induction coil to multiple locations on the jumper.

As an example of how to determine whether a hydrate plug has formed in an unheated jumper associated with an electrically heated flowline, the following procedure may be used. First, the flowline is heated to a sufficient temperature for a sufficient length of time that any hydrate plugs that may have formed in the flowline have been eliminated. Then, valves on associated wells are opened one at a time. If flow is not observed after a valve is opened, it can be assumed that a hydrate plug has been formed in the associated well jumper or the intervening flowline-to-flowline jumper or the flowline-to-manifold jumper. If there are wells distributed along the flowline, the wells nearest the host can be opened first. This will allow isolating the hydrate plug to either the well jumper or next flowline jumper downstream from the well. By isolating the hydrate plug to only one or two jumpers, practical remedial techniques can be applied, which may include induction heating of the jumper. An attempt can be made to flow the well after only one jumper has been heated. If flow is still blocked, then another jumper can be heated.

Examples of Induction Heating of Pipelines

For three different size pipes, an induction wire coil was spread uniformly in the noted number of turns over about 1 meter length of the pipe. The current, voltage and power were measured with the induction wire coil on the pipe. Then for about the same currents, the current, voltage and power were measured for the same length of wire not wrapped around the pipe. The difference in power at the same current level gives the power dissipated in the pipe.

EXAMPLE 1

| | |
|---|---|
| ID of pipe | 5.25 inches |
| OD of pipe | 6.75 inches |
| Wall thickness | 0.75 inch |
| Insulation thickness | 1.75 inch |

Test 1A–5 turns over 1 meter

| Volts | Amperes | Power Dissipated in Pipe (Watts) |
|---|---|---|
| 0.183 | 49.0 | 3 |
| 0.406 | 100.9 | 18 |
| 0.663 | 149.4 | 44 |
| 0.924 | 200.3 | 85 |
| 1.200 | 249.6 | 140 |
| 1.459 | 299.8 | 211 |
| 1.707 | 350.6 | 287 |
| 1.952 | 401.5 | 376 |
| 2.183 | 450.5 | 471 |

Test 1B–10 turns over 1 meter

| Volts | Amperes | Power Dissipated in Pipe (Watts) |
|---|---|---|
| 1.076 | 100.8 | 60 |
| 1.709 | 149.5 | 143 |
| 2.336 | 200.9 | 263 |
| 2.891 | 250.0 | 403 |
| 3.428 | 300.3 | 570 |
| 3.932 | 350.1 | 757 |
| 4.424 | 401.2 | 968 |
| 4.876 | 450.2 | 1184 |
| 5.315 | 500.1 | 1429 |

EXAMPLE 2

| | |
|---|---|
| ID of pipe | 6.65 inches |
| OD of pipe | 8.40 inches |
| Wall thickness | 0.875 inch |
| Insulation thickness | 1.125 inch (foam) |

Test 2A–5 turns over 1 meter

| Volts | Amperes | Power Dissipated in Pipe (Watts) |
|---|---|---|
| 0.332 | 100.9 | 11 |
| 0.531 | 149.4 | 26 |
| 0.771 | 200.3 | 57.2 |
| 1.017 | 249.6 | 98 |
| 1.272 | 299.8 | 157 |
| 1.524 | 350.6 | 224 |
| 1.773 | 401.5 | 304 |
| 2.006 | 450.5 | 389 |

Test 2B–10 turns over 1 meter

| Volts | Amperes | Power Dissipated in Pipe (Watts) |
|---|---|---|
| 1.076 | 100.8 | 61 |
| 1.709 | 149.5 | 147 |
| 2.336 | 200.9 | 270 |
| 2.891 | 250.0 | 414 |
| 3.428 | 300.3 | 586 |
| 3.932 | 350.1 | 779 |
| 4.424 | 401.2 | 997 |
| 4.876 | 450.2 | 1220 |
| 5.315 | 500.1 | 1474 |

EXAMPLE 3

| | |
|---|---|
| ID of pipe | 5.375 inches |
| OD of pipe | 6.625 inches |
| Wall thickness | 0.625 inch |
| Insulation | 0.3 inch (polypropylene) |

Test 3A–5 turns over 1 meter

| Volts | Amperes | Power Dissipated in Pipe (Watts) |
|---|---|---|
| 0.29 | 100.0 | 14 |
| 0.666 | 199.8 | 62 |
| 1.044 | 301.4 | 151 |
| 1.39 | 401.6 | 268 |
| 1.71 | 501.1 | 410 |

Test 3B–10 turns over 1 meter

| Volts | Amperes | Power Dissipated in Pipe (Watts) |
|---|---|---|
| 1.188 | 101.4 | 73 |
| 2.377 | 200.5 | 287 |
| 3.360 | 299.0 | 599 |
| 4.253 | 400.0 | 1018 |
| 5.051 | 499.7 | 1506 |

The data show that inductive heating of pipelines is effective with only a moderate number of turns of cable per meter at practical values of pipe sizes, frequencies, and insulation thickness. Moreover, the current levels necessary are in the range of direct pipe currents that are expected.

The inventive features of the present application, including induction heating of jumpers, apply not only to main pipelines heated by the single heated insulated pipe configurations discussed above, but also to the earthed current method developed by Statoil (discussed above) and to the pipe-in-pipe method disclosed in patent applications Ser. No. 08/92 1,737, filed Aug. 8, 1997 and in Ser. No. 08/625, 428, filed Mar. 26, 1996, both commonly assigned, which are hereby incorporated by reference herein. In applying the present invention in pipeline systems where the pipe-in-pipe method of heating is used for the main pipelines, single insulated pipes should be used for jumpers. With the pipe-in-pipe method in the main pipeline, no buffer zone is required between the segment heated and a jumper or other attached structure.

A jumper may be placed in a non-horizontal orientation, such that one end is higher than the other. The difference in elevation between the ends can be selected over a range of values, but may be a few feet. An induction coil may then be placed at the lower end of the jumper. Heat supplied at the lower end can then be moved along to the higher elevations of the jumper by convection currents in the fluid inside the jumper. This may avoid the need to move the coil along the jumper to heat the entire jumper. Also, hydrate may be preferentially collected at the lower end of the jumper, where water is more likely to collect.

The disclosure has heretofore been limited to use of inductive heating for electrically heated subsea pipelines, including embodiments in which electrical power is supplied to an induction coil from a source separate from the pipeline current. It should be understood that inductive heating as described herein may also be used for pipelines and other subsea equipment that are not electrically heated. In this situation, the electrical power will be supplied from a separate surface or subsurface source. For example, if the location of a hydrate plug or paraffin plug in an unheated pipeline is determined, an inductive heating coil, which may be a clamp as described herein or a cable wrapped around the plugged segment, may be put in place around the pipeline and power supplied to unplug the pipeline. Equipment other than a pipeline may also be unplugged using the inductive heating method. For example, a subsea christmas tree on a well may become plugged because of hydrate. An inductive coil in the form of a clamp or cable wrapped around the tree may be used to remove a plug by application of electrical power.

Having described the invention above, various modifications of the techniques, procedures, material, and equipment will be apparent to those skilled in the art. It is intended that all such variations within the scope and spirit of the invention be included within the scope of the appended claims.

What is claimed is:

1. An electrically heated subsea pipeline system, comprising:
    a first segment of pipeline, the first segment being a single heated insulated pipeline and having a wall, wherein the pipeline is heated by a flow of electrical current in the wall of the pipeline;
    a buffer zone of pipeline, the buffer zone being adjacent the segment of single heated insulated pipeline;
    a jumper, the jumper having a first end and a second end, the first end being fluidly connected to the buffer zone; and
    an induction heating coil around the jumper.

2. The pipeline system of claim 1 further comprising cables connecting supply electric current and return electric current to the induction heating coil.

3. The pipeline system of claim 2 wherein the supply and return of electric current to the induction heating coil are obtained from the flow of electrical current in the wall of the pipeline.

4. The pipeline system of claim 2 wherein the supply and return of electric current to the induction heating coil are obtained from a power source separate from the first segment of the pipeline.

5. The pipeline system of claim 1 wherein the induction heating coil is permanently affixed to the jumper.

6. The pipline system of claim 1 wherein the induction heating coil is in the form of a clamp that may be placed around the jumper after the jumper is placed subsea.

7. The pipline system of claim 1 wherein the subsea pipeline system further comprises a second segment of pipeline and the second end of the jumper is fluidly connected to the second segment of pipeline.

8. The pipeline system of claim 1 wherein the second end of the jumper is fluidly connected to a wellhead.

9. The pipeline system of claim 1 wherein the second end of the jumper is fluidly connected to a manifold.

10. An electrically heated subsea pipeline system, comprising:
    a first segment of pipeline wherein the pipeline has a pipe-in-pipe configuration wherein a first pipe having a wall is concentric inside a second pipe having a wall and the first and second pipes are electrically insulated from each other except at one or more selected locations and wherein the segment may be heated from flow of electrical current in the walls of the first and second pipes;
    a jumper, the jumper being a single insulated pipe and having a first end and a second end, the first end being fluidly connected to the first pipe; and
    an induction heating coil placed around the jumper.

11. The pipeline system of claim 10 further comprising cables connecting a supply electric current and a return electric current to the induction heating coil.

12. The pipeline system of claim 11 wherein the supply and return electric current to the induction heating coil is obtained from the flow of electrical current in the walls of the first and second pipes.

13. The pipeline system of claim 11 wherein the supply and return electric current to the induction heating coil is obtained from a power source separate from the segment of the pipeline.

14. The pipeline system of claim 10 wherein the induction heating coil is permanently affixed to the jumper.

15. The pipline system of claim 10 wherein the induction heating coil is in the form of a clamp that is placed around the jumper after the jumper is placed subsea.

16. The pipeline system of claim 10 wherein the induction heating coil is in the form of a cable that is wound around the jumper.

17. The pipeline system of claim 10 further comprising a second segment of pipeline wherein the second end of the jumper is fluidly connected to the second segment of pipeline.

18. The pipline system of claim 10 wherein the second end of the jumper is fluidly connected to a wellhead.

19. The pipeline system of claim 10 wherein the second end of the jumper is fluidly connected to a manifold.

* * * * *